(12) United States Patent
Miller et al.

(10) Patent No.: US 11,942,655 B2
(45) Date of Patent: Mar. 26, 2024

(54) BATTERY SEPARATORS WITH CROSS RIBS AND RELATED METHODS

(71) Applicant: Daramic, LLC, Charlotte, NC (US)

(72) Inventors: Eric H. Miller, Philpot, KY (US); J. Kevin Whear, Utica, KY (US)

(73) Assignee: Daramic, LLC, Charlotte, NC (US)

( * ) Notice: Subject to any disclaimer, the term of this patent is extended or adjusted under 35 U.S.C. 154(b) by 719 days.

(21) Appl. No.: 17/089,428

(22) Filed: Nov. 4, 2020

(65) Prior Publication Data

US 2021/0057697 A1 Feb. 25, 2021

Related U.S. Application Data

(60) Division of application No. 15/898,705, filed on Feb. 19, 2018, now Pat. No. 10,833,306, which is a continuation of application No. 12/904,371, filed on Oct. 14, 2010, now Pat. No. 9,935,302.

(60) Provisional application No. 61/253,096, filed on Oct. 20, 2009.

(51) Int. Cl.
| | |
|---|---|
| *H01M 50/44* | (2021.01) |
| *H01M 50/417* | (2021.01) |
| *H01M 50/449* | (2021.01) |
| *H01M 50/463* | (2021.01) |
| *H01M 10/06* | (2006.01) |
| *H01M 50/466* | (2021.01) |
| *H01M 50/489* | (2021.01) |
| *H01M 50/491* | (2021.01) |

(52) U.S. Cl.
CPC ......... *H01M 50/44* (2021.01); *H01M 50/417* (2021.01); *H01M 50/449* (2021.01); *H01M 50/463* (2021.01); *H01M 10/06* (2013.01); *H01M 50/466* (2021.01); *H01M 50/489* (2021.01); *H01M 50/491* (2021.01); *Y10T 29/49108* (2015.01)

(58) Field of Classification Search
CPC .. H01M 50/44; H01M 50/417; H01M 50/463; H01M 50/449; H01M 50/489; H01M 50/491; H01M 50/466; H01M 10/06
USPC .......................................................... 429/143
See application file for complete search history.

(56) References Cited

U.S. PATENT DOCUMENTS

| | | |
|---|---|---|
| 1,331,018 A | 2/1920 | Luthy |
| 4,664,992 A | 5/1987 | Edwards et al. |
| 5,558,952 A | 9/1996 | Knauder |

(Continued)

OTHER PUBLICATIONS

PCT Search Report dated Dec. 16, 2010; from counterpart PCT Application No. PCT/US10/53008.

(Continued)

*Primary Examiner* — James M Erwin
(74) *Attorney, Agent, or Firm* — Hammer & Associates, P.C.

(57) ABSTRACT

A separator for a lead acid battery is a porous membrane having a positive electrode face and a negative electrode face. A plurality of longitudinally extending ribs, a plurality of protrusions or a nonwoven material may be disposed upon the positive electrode face. A plurality of transversely extending ribs are disposed upon the negative electrode face. The transverse ribs disposed upon the negative electrode face are preferably juxtaposed to a negative electrode of the lead acid battery, when the separator is placed within that battery.

13 Claims, 14 Drawing Sheets

(56) References Cited

U.S. PATENT DOCUMENTS

| | | | |
|---|---|---|---|
| 5,776,630 A | 7/1998 | Bohnstedt | |
| 6,132,899 A * | 10/2000 | Young | H01M 50/406 |
| | | | 429/147 |
| 6,878,484 B2 | 4/2005 | Tanaka et al. | |
| 2012/0021272 A1 * | 1/2012 | Kramm | H01M 50/474 |
| | | | 429/139 |

OTHER PUBLICATIONS

PCT Written Opinion dated Dec. 16, 2010; from counterpart PCT Application No. PCT/US10/53008.

* cited by examiner

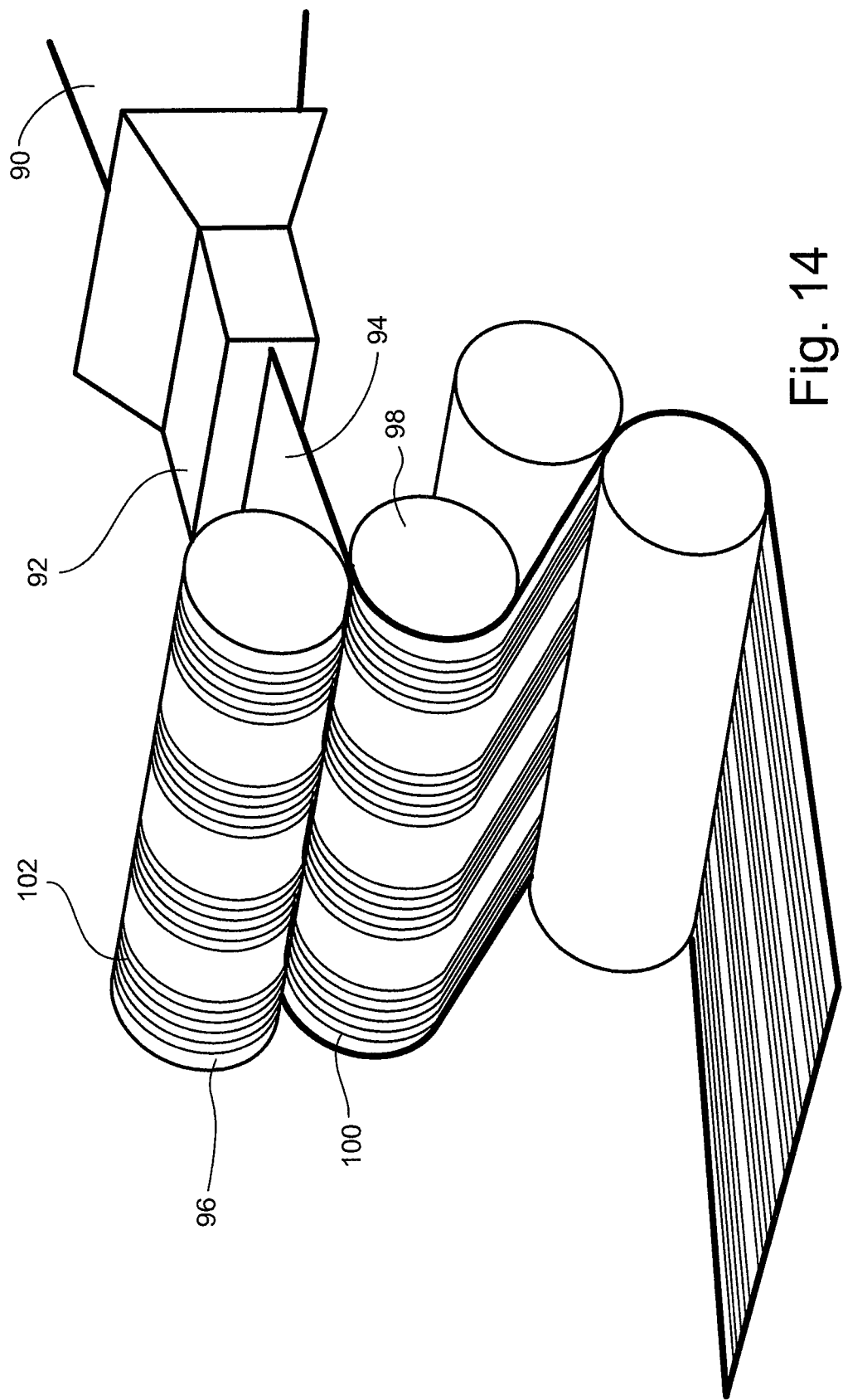

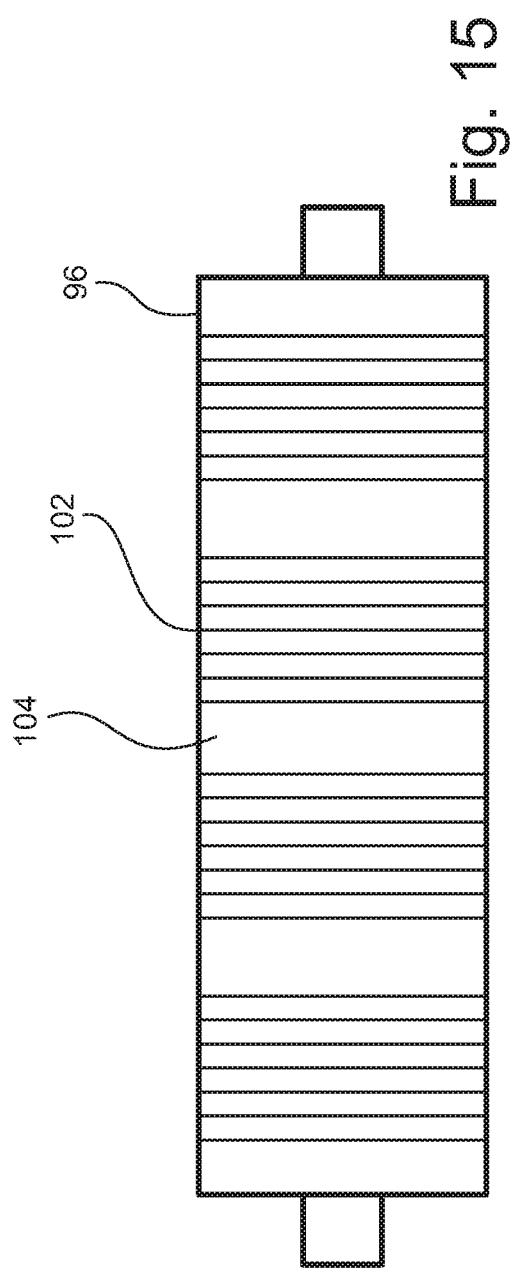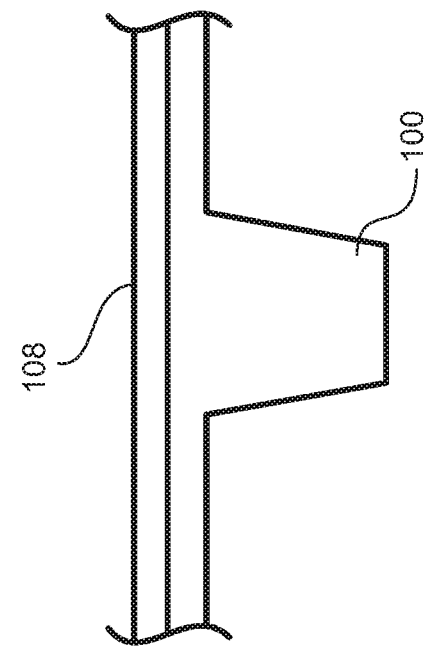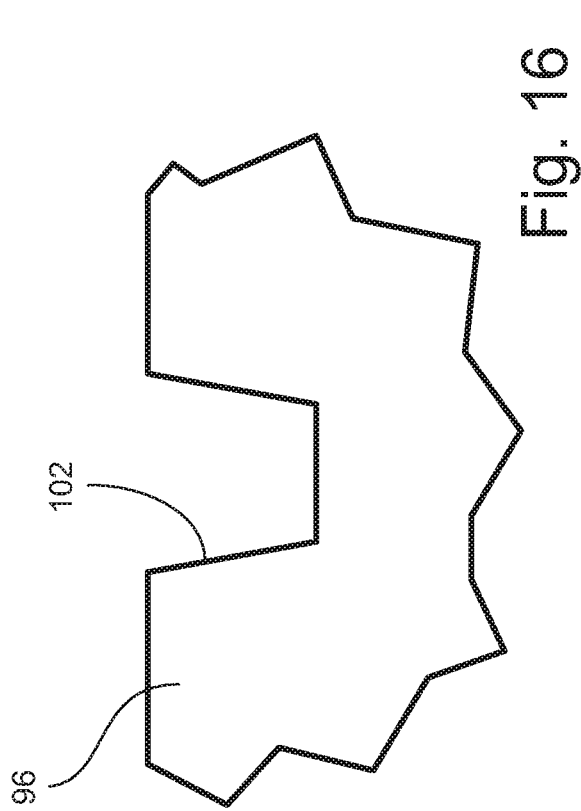

BATTERY SEPARATORS WITH CROSS RIBS AND RELATED METHODS

CROSS-REFERENCE TO RELATED APPLICATION

This application is a divisional application, which claims priority to U.S. Continuation application Ser. No. 15,898,705, filed Feb. 19, 2018, which claims priority to U.S. application Ser. No. 12/904,371, filed Oct. 14, 2010, issued as U.S. Pat. No. 9,935,302, on Apr. 3, 2018, which claims benefit to U.S. Provisional Application Ser. No. 61/253,096, filed on Oct. 20, 2009, hereby fully incorporated by reference herein.

FIELD OF THE INVENTION

The invention or inventions described hereinbelow is or are directed to battery separators, to methods of manufacture of battery separators, to methods of use of battery separators, to improved battery separators that have cross ribs, and/or to improved separators for lead acid batteries that have cross ribs that are adapted to face the negative electrode.

BACKGROUND OF THE INVENTION

Conventional wisdom in the lead acid battery or storage battery art teaches that the negative electrode face of the separator should have either no ribs or ribs that extend in the longitudinal (i.e. vertical or machine) direction. See FIGS. 2 and 3 (discussed below). This understanding is based upon the generation of hydrogen gas at the negative electrode during overcharging. It was believed that if one were to place other than vertical or longitudinally extending ribs on the negative electrode face of the separator, then the hydrogen gas would be trapped under those ribs, and that this entrapped hydrogen gas would lead to an undesired reduction of efficiency of the battery. It was believed that an efficiency reduction would result from the hydrogen gas preventing the electrolyte from contacting a portion of the negative electrode surface. Thus, the effective surface area of the negative electrode would be reduced.

Referring to FIG. 2, a prior art separator 30 is illustrated. Separator 30 has a negative electrode side 32 and a positive electrode side 34 (the part folded over). The positive electrode side 34 includes a plurality of longitudinally extending major ribs 36. The negative electrode side 32 includes a plurality of longitudinally extending minor ribs 38. One difference between major ribs 36 and minor ribs 38 is their height, major ribs 36 being greater in height than minor ribs 38. Another difference is the spacing between the ribs, major ribs 36 being more spaced apart than minor ribs 38. Such a separator is commercially available from Daramic, LLC of Charlotte, NC under the trade name of DARAMIC® in various versions.

Referring to FIG. 3, a prior art separator 40 is illustrated. Separator 40 has a positive electrode side 42 and a negative electrode side 44. The positive electrode side 42 includes a plurality of longitudinally extending ribs 46. The negative electrode side 44 (the part folded over) has no ribs. Such a separator is commercially available from Daramic, LLC of Charlotte, NC under the trade name of DARAMIC® in various versions.

U.S. Pat. No. 5,776,630 discloses a separator for use in accumulators having both longitudinal and traverse ribs located on the positive electrode face of the separator.

There is a need for improved or specialized separators for at least particular separator applications, methods of separator manufacture, methods of battery manufacture, methods of separator use, improved separator envelopes, improved batteries, and/or the like.

SUMMARY OF THE INVENTION

In accordance with at least selected embodiments, the present invention addresses the need for improved or specialized separators for at least particular separator applications, methods of separator manufacture, methods of battery manufacture, methods of separator use, improved separator envelopes, improved batteries, and/or the like.

In accordance with at least certain embodiments, the present invention is directed to improved or specialized battery separators, to methods of manufacture of battery separators, to methods of use of battery separators, to improved battery separators that have cross ribs, and/or to improved separators for lead acid batteries that have cross ribs that are adapted to face the negative electrode and preferably provide improved bending stiffness.

At least selected embodiments of the present invention are directed to battery separators, to methods of manufacture of battery separators, to methods of use of battery separators, and/or to improved separators for lead acid batteries that have cross ribs that are adapted to face the negative electrode. Further, at least selected embodiments of the present invention can also be applied to materials comprising substrates for shoe soles, printing media, and membranes for packaging applications.

In accordance with at least one embodiment, a separator for a lead acid battery is a porous membrane (such as a microporous or macroporous membrane) having a positive electrode face and a negative electrode face. A plurality of longitudinally extending ribs may be disposed upon the positive electrode face. A plurality of substantially non-longitudinal or substantially transversely extending ribs (cross ribs) are disposed upon the negative electrode face (negative cross ribs). The transverse ribs disposed upon the negative electrode face are adapted to be juxtaposed to a negative electrode of the lead acid battery, when the separator is placed within that battery.

At least one object of the present invention is the provision of an improved battery separator, improved method of manufacture of a battery separator, improved method of use of a battery separator, and/or improved separators for lead acid batteries that have cross ribs that are adapted to face the negative electrode.

In accordance with at least selected embodiments, other objects of the present invention may include the provision of improved or specialized battery separators, improved methods of manufacture of battery separators, improved methods of use of battery separators, and/or improved separators for lead acid batteries that have cross ribs that are adapted to face the negative electrode and preferably provide improved bending stiffness.

BRIEF DESCRIPTION OF THE DRAWINGS

For the purpose of illustrating at least selected embodiments, features and/or aspects of the invention or inventions, there is shown in the drawings one or more forms that may be presently preferred; it being understood, however, that the embodiments, invention or inventions are not limited to the precise arrangements and instrumentalities shown.

FIG. 14 is a schematic perspective view illustration of at least a selected embodiment of the manufacture of at least one embodiment of the inventive separator profile of the present invention.

FIG. 15 is a schematic side view illustration of at least one embodiment of a positive longitudinal rib forming roll.

FIG. 16 is an enlarged schematic cross section view detail of a portion of the positive roll of FIG. 15.

FIG. 17 is a schematic end view detail of a portion of a separator formed by the positive roll of FIGS. 15 and 16.

DETAILED DESCRIPTION OF THE INVENTION

Figure 1:
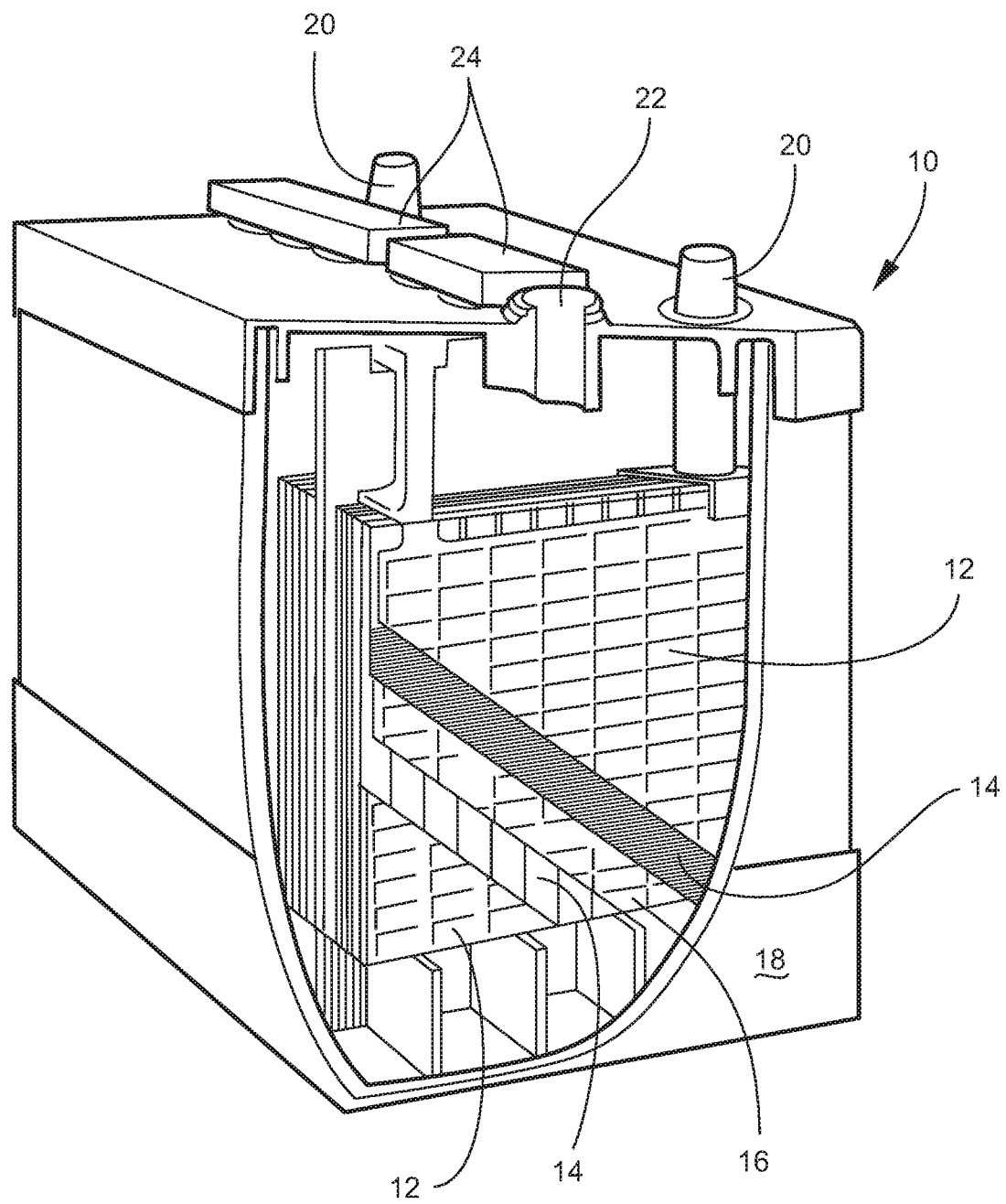
FIG. 1 is a schematic perspective view representation of a lead acid battery, with parts broken away, illustrating a placement of at least one embodiment of the present separator therein.
Figure 2:
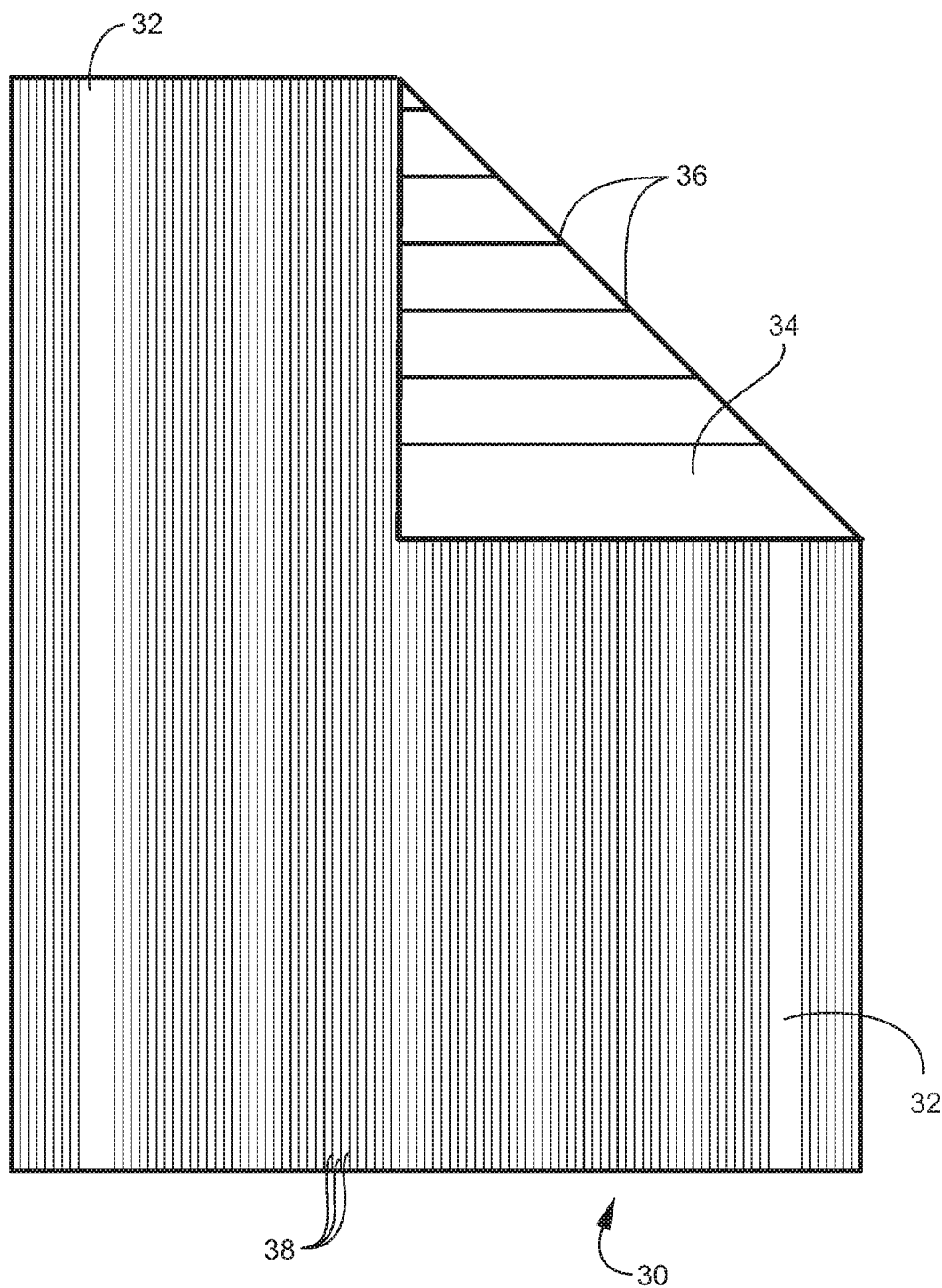
FIG. 2 is a back plan view illustration of a prior art separator for a lead acid battery, with a part folded over.
Figure 3:
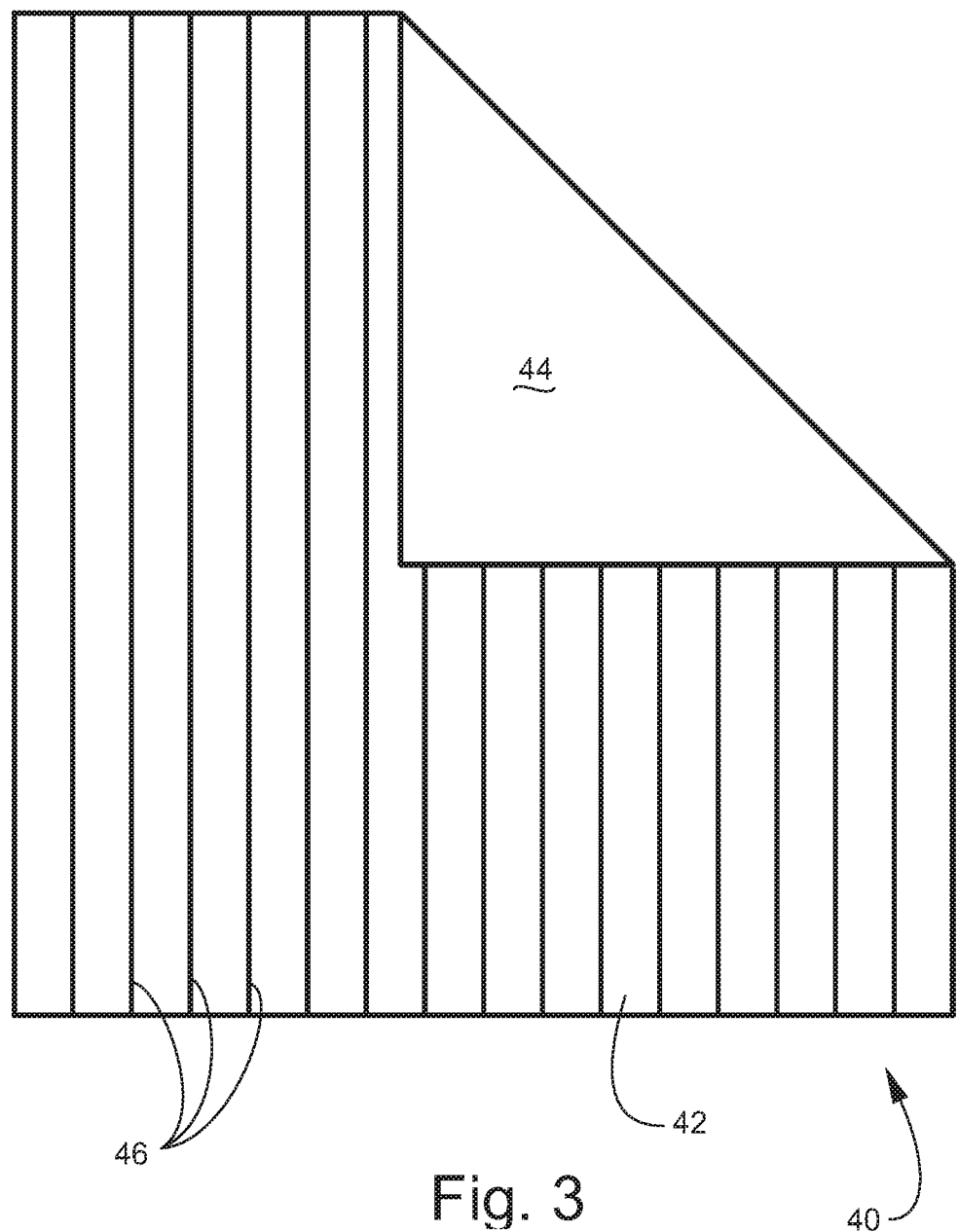
FIG. 3 is a front plan view illustration of another prior art separator for a lead acid battery, with a part folded over.

Referring to the drawings wherein like elements have like reference numerals, there is shown in FIG. 1 an illustration of a lead acid battery 10, for example, an SLI battery. Battery 10 includes a negative plate (electrode) 12 and a positive plate (electrode) 16 with a possibly preferred inventive separator 14 sandwiched therebetween. These components are housed within a container 18 that also includes terminal posts 20, vents 22, and gang-vent plugs 24 known in the art. The separator 14 preferably has transverse ribs 52 on the surface 54 that faces negative plate 12 and has longitudinal ribs 56 on the surface 58 that faces positive plate 16 (see, for example, FIGS. 1, 4 and 5). Although a particular battery is shown, the inventive separator may be used in many different types of batteries or devices including for example, but not limited to, sealed lead acid, flooded lead acid, ISS lead acid, combined battery and capacitor units, other battery types, capacitors, accumulators, and/or the like.

Figure 4:
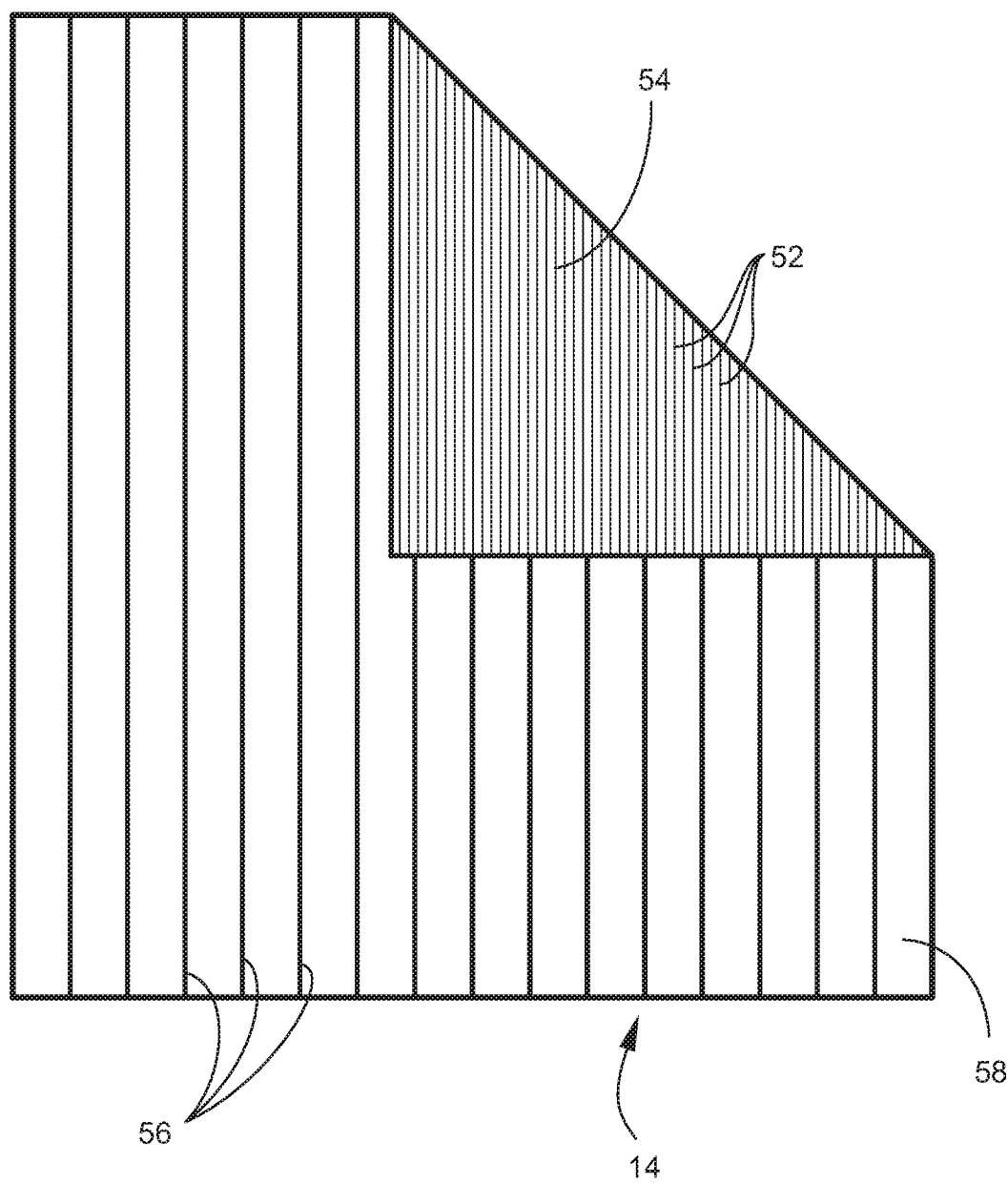
FIG. 4 is a front plan view illustration of at least one embodiment of the separator of the instant invention, with a part folded over.

The inventive separator 14, see FIG. 4, is preferably a porous membrane (such as a microporous membrane having pores less than about 1 micron, or a macroporous membrane having pores greater than about 1 micron) made of natural or synthetic materials, such as polyolefin, polyethylene, polypropylene, phenolic resin, PVC, rubber, synthetic wood pulp (SWP), glass fibers, cellulosic fibers, or combinations thereof, more preferably a microporous membrane made from thermoplastic polymers. The preferred microporous membranes may have pore diameters of about 0.1 micron (100 nanometers) and porosities of about 60%. The thermoplastic polymers may, in principle, include all acid-resistant thermoplastic materials suitable for use in lead acid batteries. The preferred thermoplastic polymers include polyvinyls and polyolefins. The polyvinyls include, for example, polyvinyl chloride (PVC). The polyolefins include, for example, polyethylene, ultrahigh molecular weight polyethylene (UHMWPE), and polypropylene. One preferred embodiment may include a mixture of filler (for example, silica) and UHMWPE. In general, the preferred separator may be made by mixing, in an extruder, about 30% by weight silica with about 10% by weight UHMWPE, and about 60% processing oil. The mixture may also include minor amounts of other additives or agents as is common in the separator arts (such as wetting agents, colorants, antistatic additives, and/or the like) and is extruded into the shape of a flat sheet. The ribs are preferably formed by the engraved surfaces of opposed calender rollers (see FIG. 14). Thereafter, much of the processing oil is extracted, and the microporous membrane is formed.

Separator 14 preferably includes a backweb 59, a positive electrode side 58 and a negative electrode side 54. The positive electrode side or face 58 preferably includes a plurality of longitudinally extending major ribs 56. Major ribs 56 may be any pattern including for example, see FIG. 4, spaced longitudinal ribs on one face of the separator. Also, as is known in separators, in the areas to be folded over and sealed or joined, the ribs 56 may be shorter or eliminated to provide for a good seal or weld.

Figures 5, 5A:
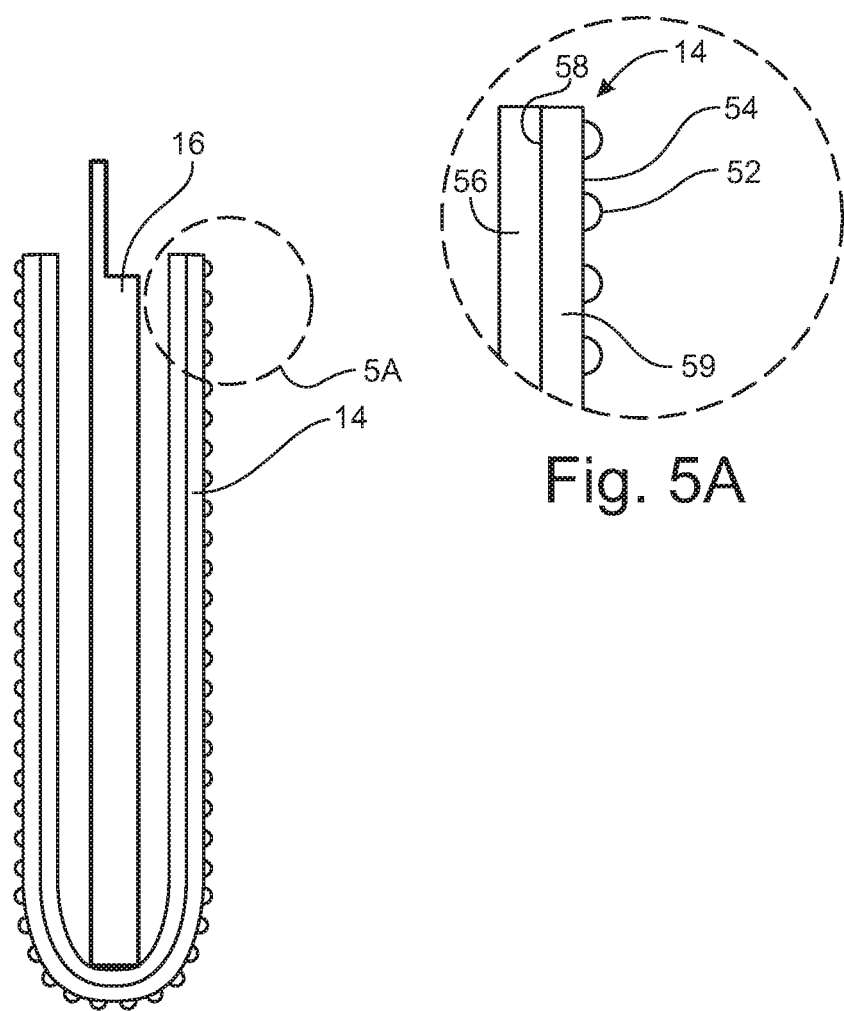
FIG. 5 is a schematic cut-away side elevation view illustration of at least one embodiment of the separator of the instant invention, with the separator folded over a positive plate and forming an envelope or pocket about the plate.
FIG. 5A is an enlarged detail view of a portion of the separator of FIG. 5.
Figure 6:
FIGS. 6-10 are respective schematic back plan view illustrations of various embodiments of the negative cross ribs of the instant invention.
Figure 7:
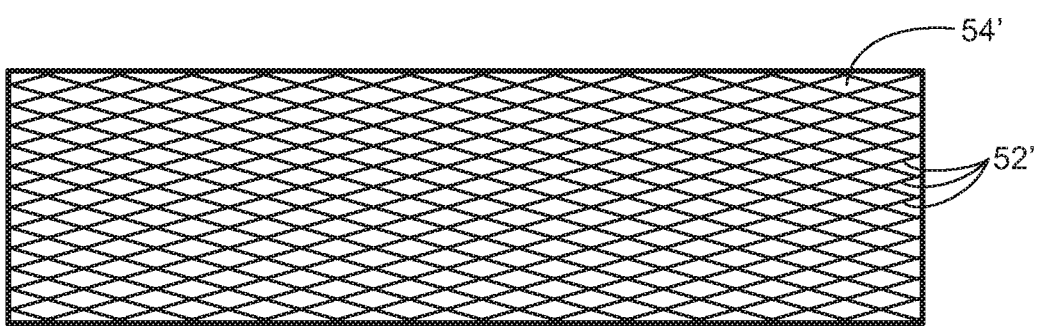
Figure 8:
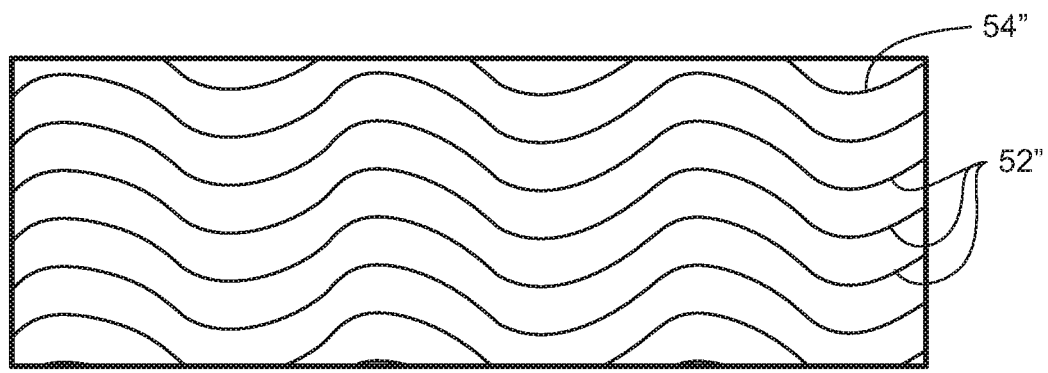
Figure 9:
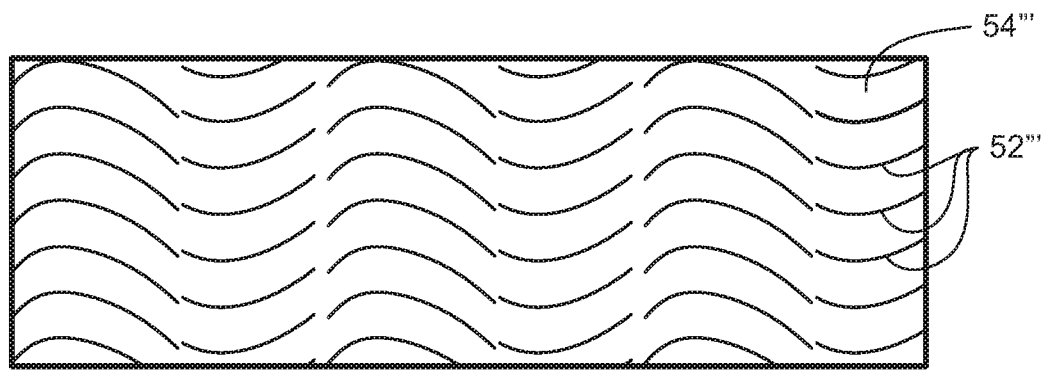
Figure 10:
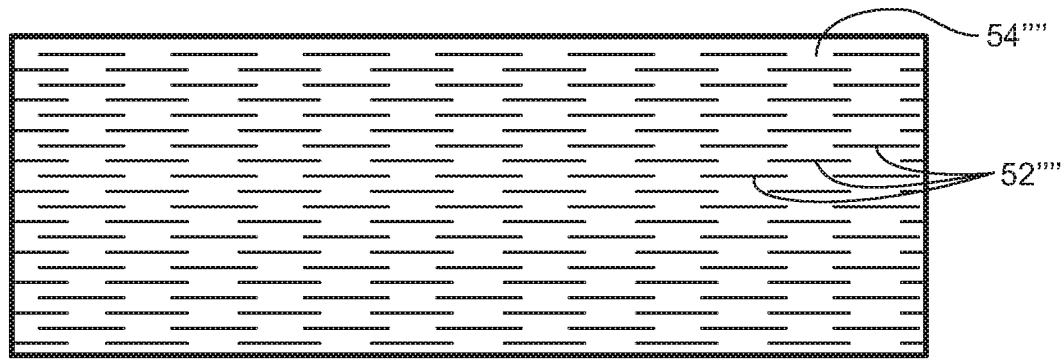

The negative electrode side or face 54 (technical back) preferably includes a plurality of transversely extending ribs (negative cross ribs), see FIG. 4, the part folded over, or FIGS. 5 and 5A. In general, transversely extending ribs 52 include any substantially transverse or non-longitudinal rib pattern (such rib patterns would apparently block or impede the escape of gases formed at the negative electrode during charging (or over charging)). Non-limiting examples of these rib patterns include: continuous (i.e., side-to-side) linear ribs 52 of side 54 of separator 14, FIGS. 4, 5 and 6; cross-hatched (diagonal, diamond or knurled) 52' of separator side 54', FIG. 7; sinusoidal or wavy continuous 52" of separator side 54", FIG. 8; wavy discontinuous 52'" of separator side 54'", FIG. 9; or intermittent and registered linear 52"" of separator side 54"", FIG. 10. Other rib patterns which include variations of the foregoing are also included.

With reference again to FIGS. 1, 5 and 5A of the drawings, the separator 14 may be folded over the positive plate or electrode 16 with positive ribs 56 contacting plate 16 and negative ribs 52 facing outwardly toward a negative plate 12 (to form a pocket or envelope). In accordance with one particular example, cross ribs 52 are about 4 mils thick, backweb 59 is about 6 mils thick and positive ribs 56 are about 20 mils thick (total separator thickness about 30 mils).

With reference to FIGS. 1 and 5, the preferred separator 14 may be a cut piece separator or a wrapping, envelope, pouch, pocket, or laminate with glassmat or synthetic nonwoven type separator.

In accordance with at least one object of the present invention, there is provided a battery separator with minor transverse cross-ribs on the opposite face of the separator as the major longitudinal ribs.

In accordance with at least another object of the present invention, there is provided a battery separator with transverse cross-ribs on the opposite face of the separator as the longitudinal ribs. The transverse ribs unexpectedly increase stiffness and protection of the sheet allowing for reduction of mass of the back-web, reduced ER, reduced cost, and increased physical properties such as may be required for high speed production and assembly (including high speed separator, envelope, and/or battery production and/or assembly). Such separators or precursors can be produced in rolls, envelopes (or pockets) and pieces, and may be used where processing of separators by high speed automation or hand assembly is utilized and high productivity is desired.

It has been surprisingly discovered that the mass of the separator can be reduced while maintaining physical properties needed for processing and performance inside the battery by adding transverse or cross ribs opposite, for example, the major longitudinal ribs. The mass of the major rib is preferably reduced when the cross ribs are added to the opposite side to achieve the desired overall separator thickness (major rib+backweb+cross rib). The sheet can also be reduced in thickness and/or mass while maintaining productivity properties such as rigidity as well as protecting the sheet from abrasion and oxidation rips and tears during the life of the battery by adding transverse or cross ribs.

It is another object of at least one embodiment to provide cost reduction with the reduction of mass of the separator while maintaining the key physical parameters needed for high speed production. Usually, separators with less mass are more difficult to handle and hinder the speed of battery production thereby increasing cost (not lowering it). Utilizing the mass more effectively and wisely by adding negative cross ribs to the positive longitudinal or major ribs allows for cost reduction with the reduction of mass of the separator while maintaining the key physical parameters and customer satisfaction.

Adding negative cross ribs to the separator with positive major ribs also addresses stiffness issues as well as wrinkling or bagginess production issues related to certain separators. At least one study reported a stiffness improvement of at least about 40% with the addition of the inventive transverse, mini ribs. Surprisingly, the addition of a minimal size of mini cross rib, for example a 100 micron negative cross rib, can yield significant rigidity, reduce mass of the separator and not hinder battery performance.

In accordance with at least one embodiment, small, tightly spaced transverse ribs are added to the side of the lead acid separator which contacts the negative electrode (preferably in addition to major ribs on the positive side). The small, tightly spaced negative transverse ribs can be in many different forms, as seen for example in FIGS. 6 to 13, including without limitation, sinusoidal, diagonal or straight rib patterns, that are continuous or discontinuous. For ease of processing, the rounded straight ribs of FIGS. 5, 6 and 11 to 13 may be preferred.

The positive longitudinal major ribs can take many forms that run substantially in the longitudinal directional, for example, sinusoidal, diagonal or straight ribs, that are continuous or discontinuous. For ease of processing, the rounded straight ribs of FIGS. 11 to 13 may be preferred. In certain battery designs, often referred as the Japanese Design, there are no positive ribs, instead they are replaced with a heavy glass-mat laminated to the flat positive face of the separator. In this glass-mat positive face separator embodiment, the transverse negative ribs of the present invention function in the same fashion as the embodiments with positive longitudinal ribs. The positive face may be smooth or flat, have projections, have ribs, or have a nonwoven bonded or laminated thereto. Such nonwoven materials may be formed of synthetic, natural, organic or inorganic materials or blends, such as fiberglass, polyester (PET), recycled PET, or combinations thereof. The separator may be a cut piece separator or a wrap, envelope, pouch, or pocket type separator.

With regard to at least selected embodiments of the present invention, separator 14 preferably has the following:
1) Transverse Rib Height—preferably between about 0.02 to 0.30 mm, and most preferably between about 0.075 to 0.15 mm.
2) Sheet (Substrate) Thickness—preferably between about 0.065 to 0.75 mm.
3) Overall Thickness (positive rib+backweb+negative rib)–overall thickness of the separator preferably between about 0.200 to 4.0 mm.
4) Mass Reduction—preferably greater than 5%, more preferably greater than 10%. The transverse ribs increase the transverse rigidity of the separator and allow for the backweb or substrate thickness to be decreased. Mass can be removed from both the backweb and positive ribs while maintaining and increasing the transverse rigidity. Also, the transverse negative ribs contribute to overall thickness of the separator. Therefore the height of the longitudinal positive rib can be directly reduced by the height of the negative cross rib.
5) Type of Separator—the separator can be made of porous materials, such as microporous or macroporous thermoplastic material, preferably polyethylene, polypropylene, polyvinyl chloride, and the mixtures thereof, as well as of rubber, polyolefin, phenolic, crosslinked phenolic resin, cellulosic, glass, or combinations thereof.

As the polyethylene (PE) separator is not normally the primary cause of failure in the lead acid battery there is continued desire to remove cost and to remove mass. However, as mass is removed, especially from the backweb thickness, the transverse rigidity can be drastically reduced. The negative cross ribs of the present invention surprisingly allow the removal of mass (or reduction of mass) and maintain or improve the transverse rigidity. Without sufficient transverse rigidity, the separator may be more prone to wrinkles and foldovers during manufacture and at the assembly step of the battery plant, often called enveloping.

Additional or alternative benefits of the addition of negative cross ribs include:
1) Electrical Resistance Reduction—Since the negative cross rib profile design allows for mass removal while maintaining equivalent or higher transverse bending stiffness, the observed electrical resistance will preferably be lower.
2) Minimize Tear Propagation—When the separator is extremely oxidized, a crack or split will likely develop in the backweb and extend parallel to the major longitudinal rib. The negative cross rib will preferably arrest the propagation of such tears due to, for example, the extra mass in the ribs.
3) Side Alignment—In the assembly process, the enveloped plates are aligned horizontally and vertically before the strap is cast to connect the positive and negative electrodes respectively. For vertical alignment, the positive ribs provide a means for the separator and plate to slide when contacting each other. For typical side alignment, the negative plate may slide when contacting the flat backweb. The negative transverse ribs, will preferably offer less surface and should aid in side alignment operation.

In accordance with at least one embodiment, the separator is made up of an ultrahigh molecular weight polyethylene (UHMWPE) mixed with a processing oil and precipitated silica. In accordance with at least one particular embodiment, the negative cross ribs preferably have a 2 to 6 mil radius and a 10 to 50 mil rib spacing.

In accordance with at least selected embodiments, the battery separator includes a porous membrane having a backweb and at least two rows of positive ribs on the positive side of the backweb, and a plurality of negative cross ribs or transverse ribs on the negative side of the backweb. The positive ribs may be straight or wavy, may have a solid portion, and may have a truncated pyramidal shape. The membrane may be selected from the group of polyolefin, rubber, polyvinyl chloride, phenolic, cellulosic, or combinations thereof, and the membrane is preferably a polyolefin material forming a battery separator for a storage battery.

A battery separator is used to separate the battery's positive and negative electrodes, and is typically microporous so that ions may pass therethrough to the positive and negative electrodes. In lead/acid storage batteries, either automotive or industrial batteries, the battery separator is typically a microporous polyethylene separator having a back web and a plurality of positive ribs standing on the back web. The separators for automotive batteries are typically made in continuous lengths and rolled, subsequently folded, and sealed along its edges to form pouches that receive the electrodes for the batteries. The separators for industrial (traction) batteries are typically cut to a size about the same as an electrode plate (piece separator).

In one embodiment of the present method of making a lead/acid battery separator from a sheet of plastic material, the sheet is calender molded to form cross or negative side transverse ribs or projections, and preferably is calender molded to simultaneously form both positive longitudinal ribs and negative cross or transverse ribs on opposite sides of the sheet.

Figure 11:
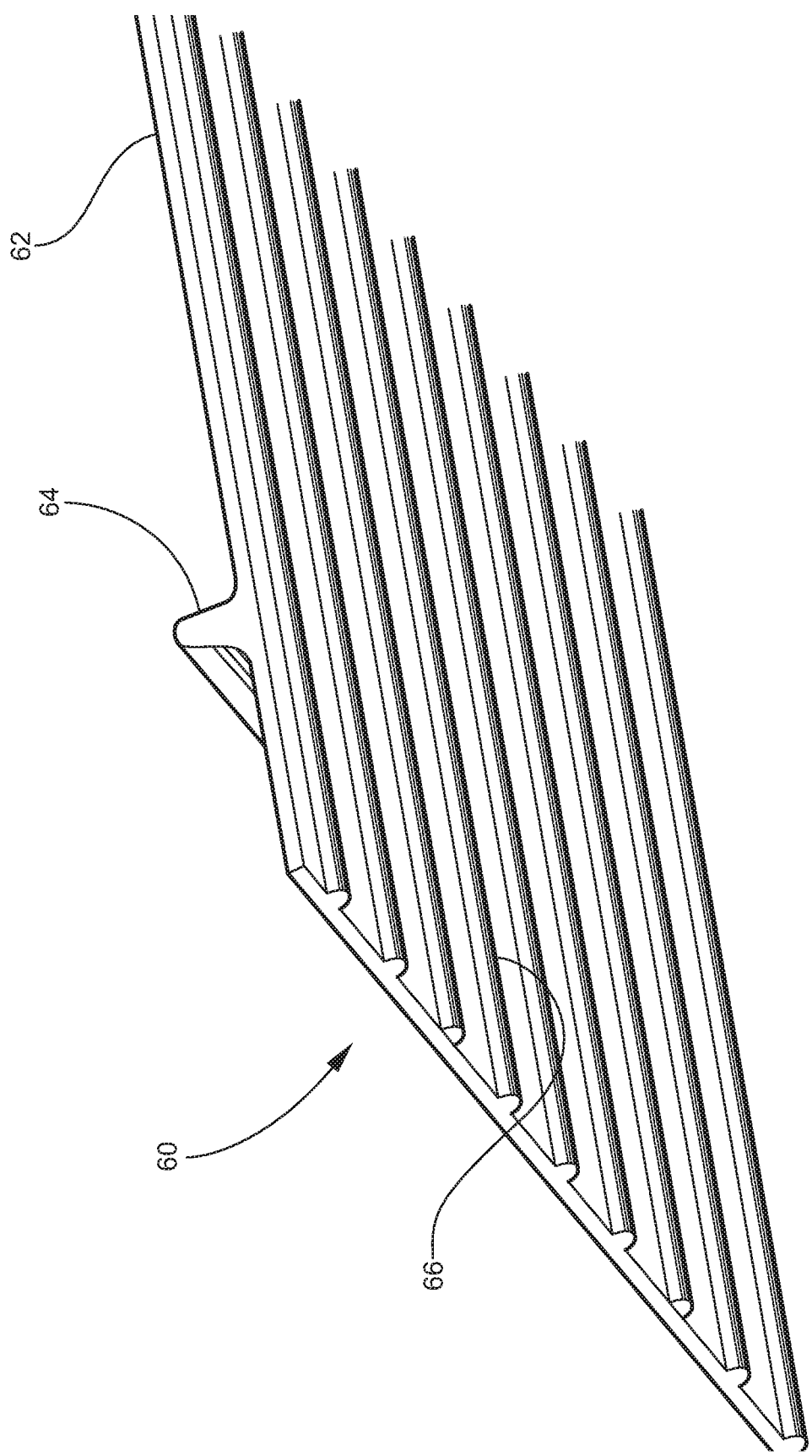
FIGS. 11-13 are respective schematic perspective view illustrations of selected particular embodiments of separators with negative cross ribs of the instant invention.
Figure 12:
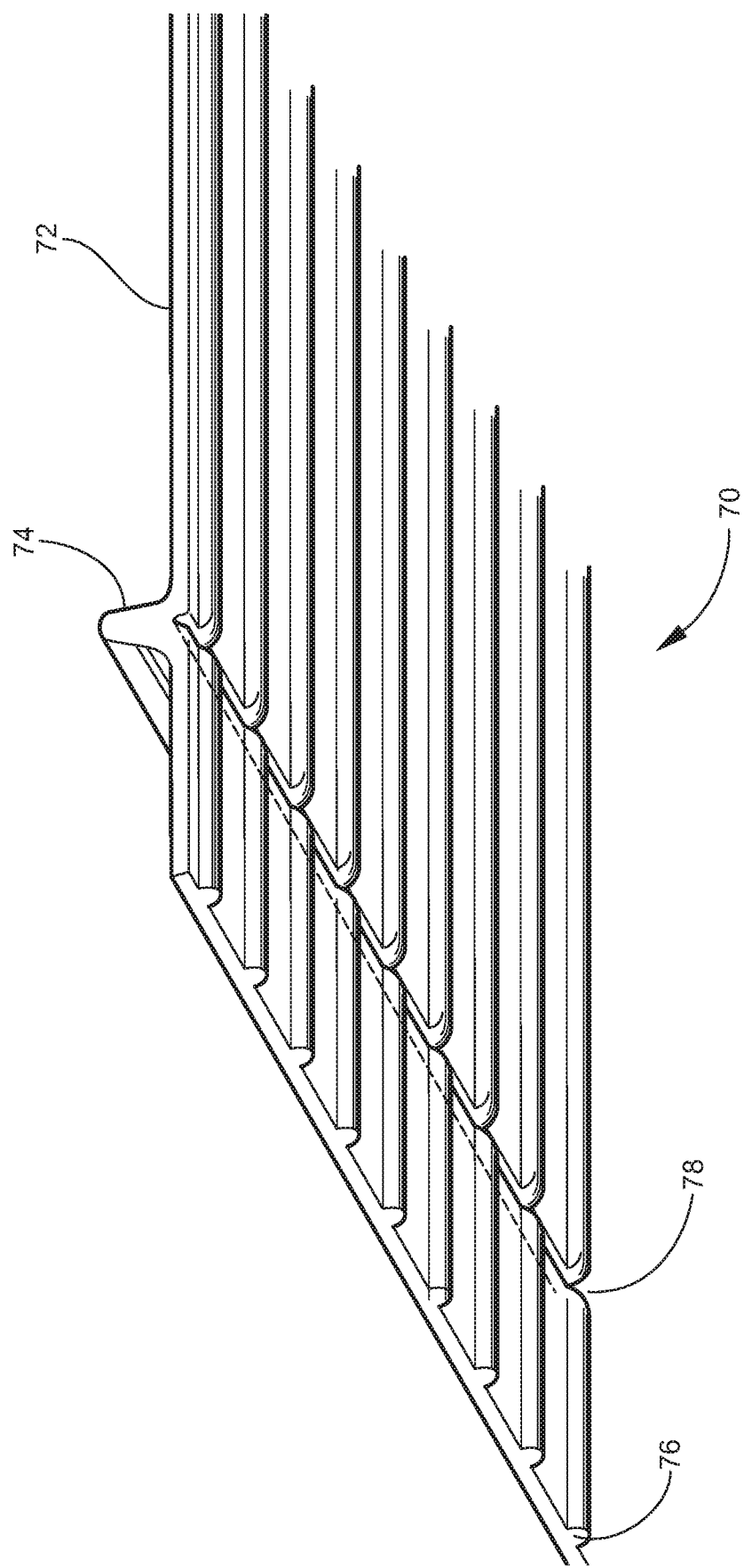
Figure 13:
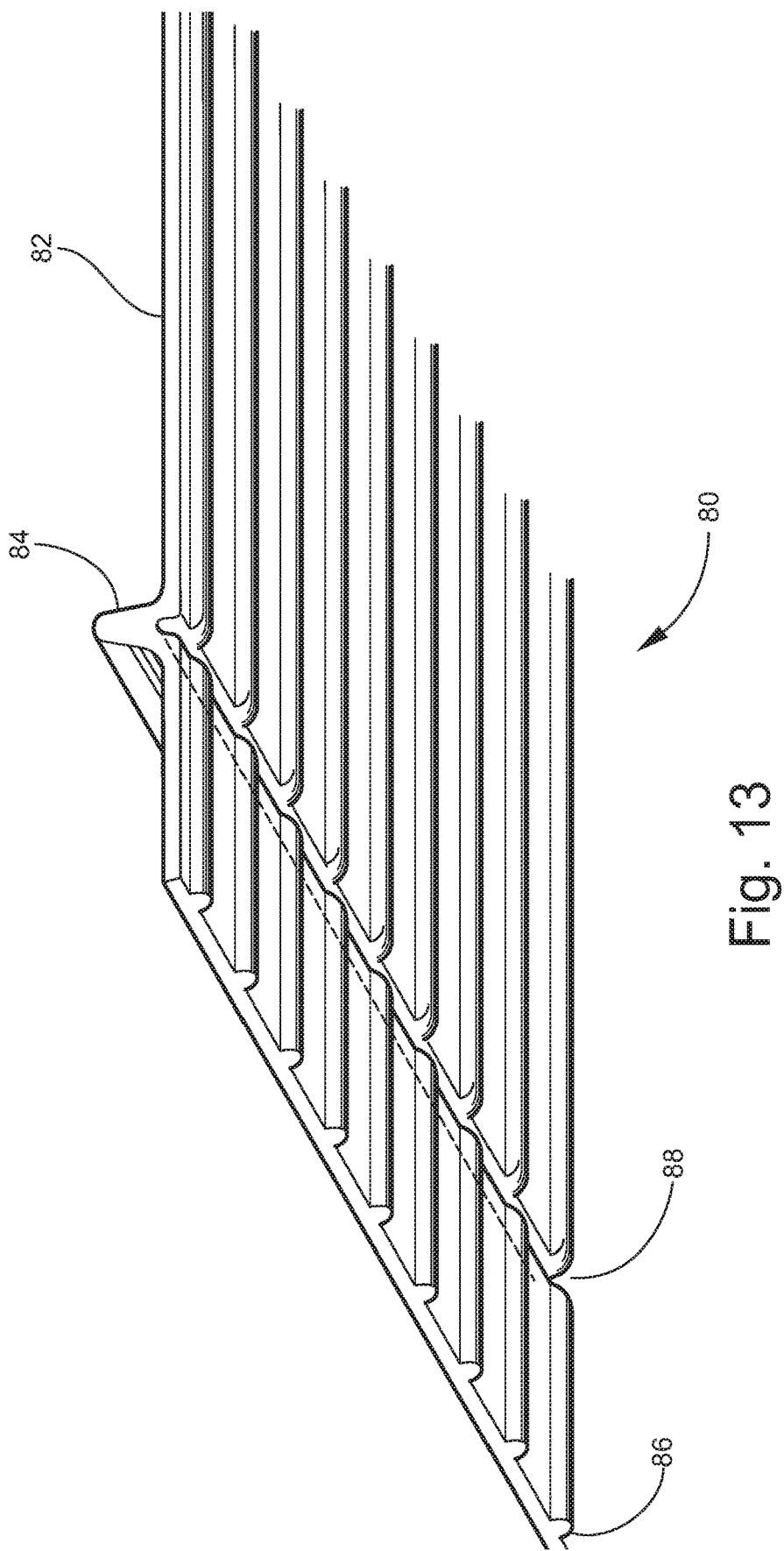

In a typical lead/acid battery separator, the separator has a ribbed positive face (i.e., with the primary ribs) and a smooth back face (i.e., without ribs). The negative electrode (plate) is placed adjacent to the back face, and the positive electrode (plate) rests on the ribs of the ribbed face. Once a battery is sufficiently charged and current is continually applied (i.e., overcharging), hydrogen is generated at the negative plate, and oxygen is generated at the positive plate. As hydrogen is formed at the negative plate, it may push the separator away from the negative plate thereby forming a gas pocket which may prevent the escape of gas, which may be deleterious to battery function because the pocket becomes an area of infinite resistance in the battery. Furthermore, if the separator's backweb is pushed to contact the positive plate, the backweb can oxidize and a hole can form. At least selected embodiments of the present invention may address this issue and provide an improved battery separator. See for example, FIGS. 11 to 13 of the drawings showing three selected separator embodiments. In FIG. 11, an exemplary separator 60 has a backweb 62, positive major ribs 64 and minor negative cross ribs 66. The negative cross ribs extend across the back or negative surface. In FIG. 12, an exemplary separator 70 has a backweb 72, positive major ribs 74 and minor negative cross ribs 76. The negative cross ribs extend across the back or negative surface and are interrupted by shallow fissures or recesses 78 behind each positive rib 74. These fissures 78 form channels which may provide for the escape of hydrogen gas, allow for extraction of plasticizer or lubricant from the positive ribs, and/or the like. In FIG. 13, an exemplary separator 80 has a backweb 82, positive major ribs 84 and minor negative cross ribs 86. The negative cross ribs extend across the back or negative surface and are interrupted by fissures or recesses 88 behind each positive rib 84. These fissures 88 form channels which may extend up into the positive rib, may provide for the escape of hydrogen gas, may allow for extraction of plasticizer or lubricant from the positive ribs, and/or the like. A separator having such channels that allow any hydrogen gas to escape, may be preferred.

In at least one embodiment, the separator is made of a microporous, thermoplastic material which is provided with longitudinal positive ribs and transverse negative ribs with the height of at least a majority of the longitudinal ribs being greater than that of the transverse ribs, and the longitudinal and transverse ribs being solid ribs which are formed integrally from the plastic, characterized in that the transverse ribs extend across substantially the entire back width of the separator. The separator sheet thickness may be approximately 0.10 to 0.50 mm, the height of the longitudinal ribs may be 0.3 to 2.0 mm and the height of the transverse ribs may be 0.1 to 0.7 mm, the longitudinal rigidity with 100 mm width may be approximately 5 mJ and the transverse rigidity may be approximately 2.5 mJ, and the total thickness of the separator may be less than 2.5 mm.

Figure 18:
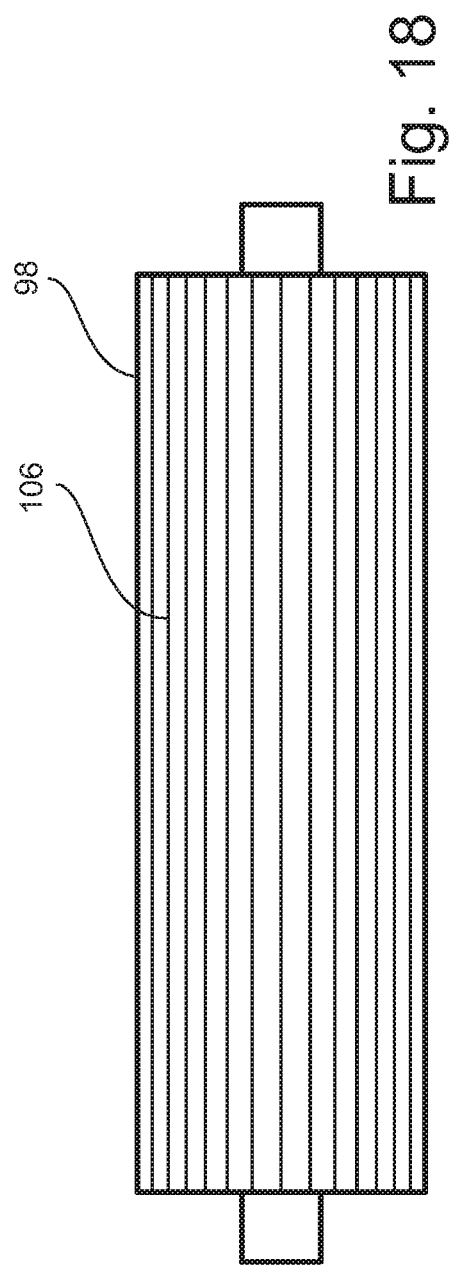
FIG. 18 is a schematic side view illustration of at least one embodiment of a negative cross rib forming roll.
Figure 20:
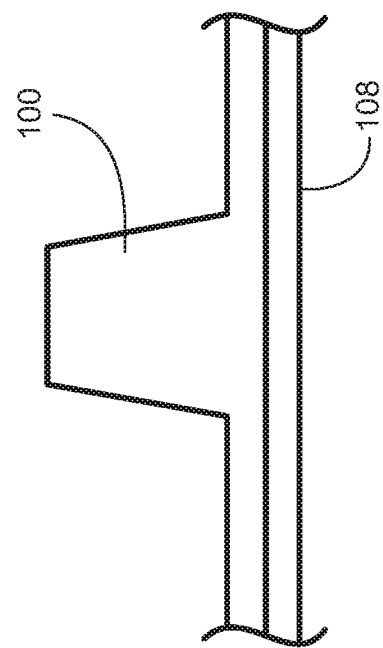
FIG. 20 is a schematic end view detail of a portion of the separator formed by the negative roll of FIGS. 18 and 19.
Figure 19:
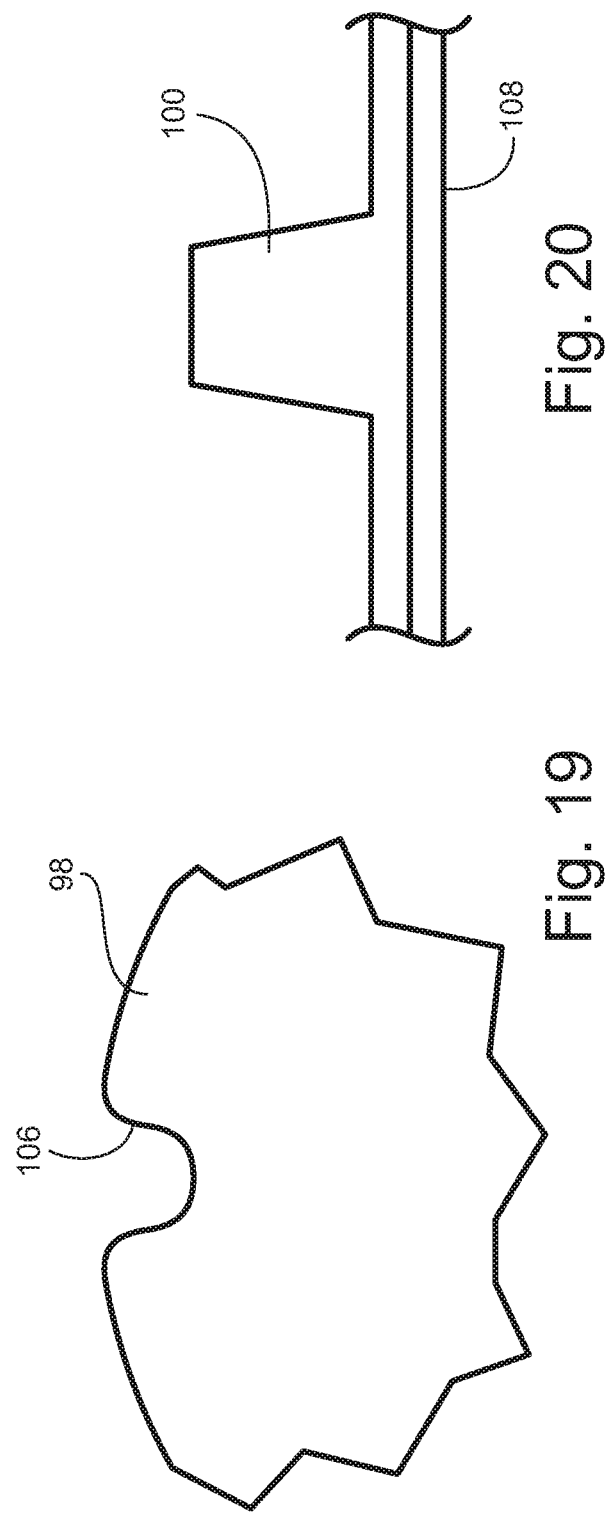
FIG. 19 is an enlarged schematic end view detail of a portion of the negative roll of FIG. 18.
Figure 21:
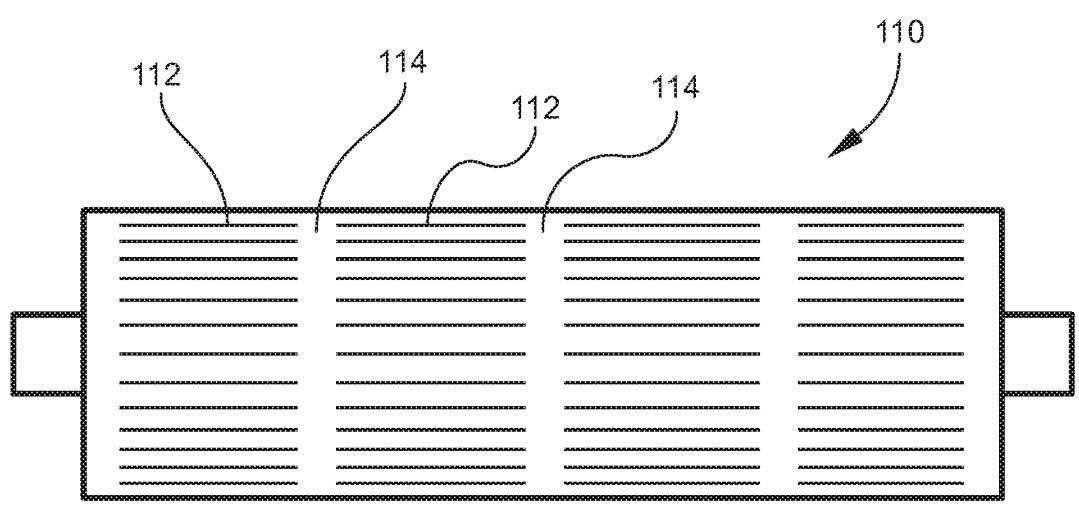
FIG. 21 is a schematic side view illustration of at least another embodiment of a negative cross rib forming roll.

With reference to FIGS. 14 to 21 of the drawings, the separators according to the present invention can be manufactured in a similar fashion as conventional polyethylene separators with the addition or substitution of a negative roll having grooves to form the negative cross ribs, a positive roll having no grooves or grooves of less depth, and/or the like. With this preferred method, the plastic material 90 containing filler is extruded through a slot die 92 to form a film 94 and then run through two calender rolls (positive roll 96, negative roll 98) by means of which both the positive longitudinal ribs 100 and the negative transverse ribs 108 are produced and the separator sheet is reduced to the desired thickness. With reference to FIGS. 15 to 17, positive roll 96 has shallow circumferential or annular grooves 102 which form positive longitudinal ribs 100. As shown in FIG. 15, lands or smooth areas or stripes 104 form smooth areas on the separator for sealing the edges of the pockets. With reference to FIGS. 18 to 20, negative roll 98 has shallow axial grooves 106 which form cross ribs 108. As shown in FIG. 21, an alternative negative roll 110 has spaced sets of shallow axial grooves 112 with smooth lands or areas 114 (for example, for welding zones) therebetween.

The separators according to the present invention with negative cross ribs preferably have a better machine workability than those without such transverse ribs, a better guidance of the separator tracks as a result of increased transverse rigidity, and the processability for placing the electrode plates in pockets should be improved because of the increased transverse rigidity. In addition, production of separators with a considerably reduced sheet thickness and consequently with a reduced electrical resistance should be possible which is of significance particularly in relation to efforts to constantly increase battery output with a constant battery volume. The separators according to the invention should be able to be processed to form pockets without difficulty on conventional machines. The additional transverse negative ribs should not cause problems either with the welding of the pockets by the use of heat or ultrasonic means or with the mechanical process for producing pockets.

In at least one particular embodiment, the separator made of elastic plastic and suitable for use in a lead acid storage battery, includes sheet material with an inner region and two peripheral regions and having positive ribs running in the longitudinal direction with the longitudinal ribs in the inner region being more widely spaced than those in the peripheral region, and having negative ribs running in the transverse direction.

EXAMPLES

The following examples further illustrate at least selected separator embodiments of the instant invention. NCR refers to the inventive separator with negative cross ribs and Flat Backweb refers to comparative separators devoid of negative cross ribs.

Comparative Data:

| Characteristic | Units | NCR | Flat Backweb |
|---|---|---|---|
| Dataset I | | | |
| Backweb Thickness | Mils | 4.7 | 6.2 |
| Negative Cross Rib Height | Mils | 4.5 | 0 |
| Measured BW + NCR | Mils | 9.2 | 6.2 |
| Electrical Resistance | Mohm-in$^2$ | 6.4 | 6.8 |
| ER Reduction | % | 5.9 | |
| Dataset II | | | |
| Backweb Thickness | Mils | 4.2 | 6.2 |
| Negative Cross Rib Height | Mils | 4.5 | 0 |
| Measured BW + NCR | mils | 8.7 | 6.2 |
| Total Residual Oil | wt % | 14.65 | 14.76 |
| Separator Basis Weight | g/m$^2$ | 98.7 | 109.4 |
| Basis Weight Reduction | % | 10.84 | |
| Dataset III | | | |
| Backweb Thickness | mils | 4.0 | 6.2 |
| Negative Cross Rib Height | mils | 4.5 | 0 |
| Measured BW + NCR | mils | 8.5 | 6.2 |
| Transverse Bending Stiffness | mN | 23.3 | 16.4 |
| Bending Stiffness Improvement [(23.3 − 16.4)/16.4] | % Diff | 42.07 | |

In accordance with the above datasets, two 6-cell batteries were constructed with 21-plate elements, consisting of 11 negative plates and 10 positive plates. Envelopes were made with typical Daramic HP material from production and material with the new negative cross-rib profile, produced in a pilot lab. The positive profiles used were similar 18-rib profile designs. The envelopes were wrapped around the positive plates. Following formation, per plate manufacturer's instructions, the batteries were charged for an additional 24 hours to ensure that the plates were fully charged before gassing evaluation. For the gas entrapment evaluation, electrolyte level was recorded on the side of the container before charging. The batteries were then charged at 16 A for 24 hours. After charging the batteries were allowed to cool to room temperature, and the electrolyte level was recorded on the side of the container. The batteries were then placed in a sealed chamber and a vacuum was pulled to approximately 0.5 atmospheres for 15 minutes. Following vacuum exposure, the electrolyte levels were again recorded on the side of the container. The difference between the pre- and post-vacuum marks was then measured using calipers. The control battery, with separators from production had an average loss during vacuum exposure of 0.5226 inches of electrolyte. The battery with the negative cross-rib separator had and average reduction of 0.4564 inches of electrolyte.

In accordance with at least selected embodiments, a separator for a lead acid battery includes:
  a porous membrane having a positive electrode face and a negative electrode face;
  a plurality of longitudinally extending ribs being disposed upon the positive electrode face; and
  a plurality of substantially transversely extending ribs being disposed upon the negative electrode face,
  wherein the transverse ribs disposed upon the negative electrode face being juxtaposed to a negative electrode, when the separator is placed within the lead acid battery,
  wherein the transversely extending ribs may be shorter and more closely spaced than the longitudinally extending ribs,
  wherein the transversely extending ribs may be one of continuous and discontinuous,
  wherein the transversely extending ribs and the longitudinally extending ribs may be formed by calender roll molding,
  wherein the separator may be one of a macroporous membrane and a microporous membrane, and
  wherein the separator is preferably a polyethylene microporous membrane.

In a separator for a lead acid battery having a porous backweb with a first surface and a second surface, it is preferred that a plurality of transverse ribs are disposed upon the second surface of the backweb. It may be preferred that the first surface is a positive electrode face and the second surface is a negative electrode face;
  at least one of no positive ribs, a plurality of longitudinally extending ribs, a plurality of projections, and a nonwoven material being disposed upon the positive electrode face; and
  wherein the transverse ribs disposed upon the negative electrode face are juxtaposed to a negative electrode, when the separator is placed within a lead acid battery. The separator may be one of macroporous and microporous. The transversely extending ribs may be one of continuous and discontinuous.

A lead acid battery may preferably include: a housing containing a positive electrode spaced apart from a negative electrode with a porous separator located between the positive electrode and the negative electrode and an electrolyte in ionic communication between the positive electrode and the negative electrode, the separator having a plurality of longitudinally extending ribs disposed on a first surface of the separator and a plurality of transversely extending ribs disposed upon a second surface of the separator, the plurality of longitudinally extending ribs being juxtaposed to the positive electrode and the transverse extending ribs being juxtaposed to the negative electrode. The transversely extending ribs may be shorter and more closely spaced than the longitudinally extending ribs. The transversely extending ribs may be one of continuous and discontinuous.

In a method of making a separator for a lead acid battery, the separator having a porous backweb with a first surface and a second surface, it may be preferred to include the step of forming a plurality of transverse ribs on the second surface of the backweb. The first surface may be a positive electrode face and the second surface a negative electrode face. The method may further include the step of forming a plurality of longitudinally extending ribs on the positive electrode face. The negative electrode face may be adapted to be juxtaposed to a negative electrode when the separator is placed within a lead acid battery. The method may further include the steps of forming a plurality of longitudinally extending fissures or openings in the transverse ribs disposed upon the negative electrode face.

At least selected embodiments of the present invention are directed to battery separators, to methods of manufacture of battery separators, to methods of use of battery separators, and/or to improved separators for lead acid batteries that have cross ribs that are adapted to face the negative electrode.

In accordance with at least one embodiment, a separator for a lead acid battery is a porous membrane (such as a microporous or macroporous membrane) having a positive electrode face and a negative electrode face. A plurality of longitudinally extending ribs are disposed upon the positive electrode face. A plurality of non-longitudinal or substantially transversely extending ribs (cross ribs) are disposed upon the negative electrode face (negative cross ribs). The transverse ribs disposed upon the negative electrode face are adapted to be juxtaposed to a negative electrode of the lead acid battery, when the separator is placed within that battery.

At least one object of the present invention is the provision of an improved battery separator, improved method of manufacture of a battery separator, improved method of use of a battery separator, and/or improved separators for lead acid batteries that have cross ribs across at least a major portion of the separator face adapted to face the negative electrode.

The improved separators of the present invention may find use as Lead-Acid Battery Separators, separators for use in starting, deep-cycling and stand-by power battery applications, or in Flooded, Gel and AGM battery types used in applications such as: starting, stationary, motive power and deep-cycle lead-acid battery applications, as well as for flooded and specialty lead-acid battery applications, and/or for premium lead-acid gel batteries. Further, such separators may be used in other batteries, accumulators, capacitors, and/or the like.

In accordance with at least selected embodiments, the present invention addresses the need for improved or specialized separators for at least particular separator applications, methods of separator manufacture, methods of battery manufacture, methods of separator use, improved separator envelopes, improved batteries, and/or the like.

In accordance with at least certain embodiments, the present invention is directed to improved or specialized battery separators, to methods of manufacture of battery separators, to methods of use of battery separators, to improved battery separators that have cross ribs, and/or to improved separators for lead acid batteries that have cross ribs that are adapted to face the negative electrode and preferably provide improved bending stiffness.

At least selected embodiments of the present invention are directed to battery separators, to methods of manufacture of battery separators, to methods of use of battery separators, and/or to improved separators for lead acid batteries that have cross ribs that are adapted to face the negative electrode. Further, at least selected embodiments of the present invention can also be applied to materials comprising substrates for shoe soles, printing media, and membranes for packaging applications.

In accordance with at least one embodiment, a separator for a lead acid battery is a porous membrane (such as a microporous or macroporous membrane) having a positive electrode face and a negative electrode face. A plurality of longitudinally extending ribs may be disposed upon the positive electrode face. A plurality of substantially non-longitudinal or substantially transversely extending ribs (cross ribs) are disposed upon the negative electrode face (negative cross ribs). The transverse ribs disposed upon the negative electrode face are adapted to be juxtaposed to a negative electrode of the lead acid battery, when the separator is placed within that battery.

At least one object of the present invention is the provision of an improved battery separator, improved method of manufacture of a battery separator, improved method of use of a battery separator, and/or improved separators for lead acid batteries that have cross ribs that are adapted to face the negative electrode.

In accordance with at least selected embodiments, other objects of the present invention may include the provision of improved or specialized battery separators, improved methods of manufacture of battery separators, improved methods of use of battery separators, and/or improved separators for lead acid batteries that have cross ribs that are adapted to face the negative electrode and preferably provide improved bending stiffness.

In accordance with at least selected embodiments of separators with about 250 micron or less backweb thickness, a bending stiffness of at least 20 mN may be preferred, at least 30 mN may be more preferred, at least 40 mN may be still more preferred, and at least 50 mN may be most preferred.

In accordance with at least two particular separator examples having the inventive cross ribs (transverse minor or mini ribs):

A first separator example with a 250 micron backweb thickness has an about 65 mN bending stiffness.

A second separator example with a 200 micron backweb thickness has an about 57 mN bending stiffness.

In accordance with at least certain embodiments, the possibly preferred bending stiffness for separators with transverse cross ribs is preferably at least about 20 mN, more preferably at least 40 mN, and most preferably at least 50 mN.

The present invention may be embodied in other forms without departing from the spirit and the essential attributes thereof, and, accordingly, reference should be made to the appended claims, rather than to the foregoing specification, as indicating the scope of the invention.

We claim:

1. A separator for a lead acid battery comprising:
a porous membrane having a positive electrode face and a negative electrode face, wherein the positive electrode face and the negative electrode face are on opposite sides of the porous membrane;
a plurality of longitudinally extending ribs being disposed upon said positive electrode face; and
a plurality of transversely extending ribs being disposed upon said negative electrode face,
wherein the plurality of longitudinally extending ribs are perpendicular to the plurality of transversely extending ribs,
wherein said plurality of transversely extending ribs disposed upon said negative electrode face being adapted to be juxtaposed to a negative electrode, when the separator is placed within the lead acid battery, wherein the plurality of transversely extending ribs are discontinuous and include a plurality of longitudinally extending fissures, channels, recesses, or openings.

2. The separator of claim 1, wherein the plurality of transversely extending ribs are shorter and more closely spaced than the longitudinally extending ribs.

3. The separator of claim 1, wherein the plurality of transversely extending ribs and the longitudinally extending ribs are formed by calendar roll molding.

4. The separator of claim 1, wherein the separator is one of a macroporous membrane and a microporous membrane.

5. The separator of claim 4, wherein the separator is a polyethylene microporous membrane.

6. A lead acid battery comprising: a housing containing a positive electrode spaced apart from a negative electrode with a porous separator located between said positive electrode and said negative electrode and an electrolyte in ionic communication between said positive electrode and said negative electrode, said separator having a plurality of longitudinally extending ribs disposed on a first surface of said separator and a plurality of transversely extending ribs disposed upon a second surface of said separator, said plurality of longitudinally extending ribs being juxtaposed to said positive electrode and said transversely extending ribs being juxtaposed to said negative electrode, wherein the transversely extending ribs are discontinuous and include a plurality of longitudinally extending fissures, channels, recesses, or openings.

7. The battery of claim 6, wherein the transversely extending ribs are shorter and more closely spaced than the longitudinally extending ribs.

8. A method of making a separator for a lead acid battery, the separator having a porous backweb with a first surface and a second surface, comprising the steps of: forming a plurality of transversely extending ribs on the second surface of the porous backweb and forming a plurality of longitudinally extending ribs on the first surface, wherein the plurality of transversely extending ribs and the plurality of longitudinally extending ribs are perpendicular to each other.

9. The method of claim 8, wherein the first surface is a positive electrode face and the second surface is a negative electrode face, said negative electrode face being adapted to be juxtaposed to a negative electrode when the separator is placed within a lead acid battery, and further comprising the steps of: forming a plurality of longitudinally extending fissures, channels, recesses, or openings in said transverse ribs disposed upon said negative electrode face.

10. The battery separator of claim 1, wherein the separator comprises ultrahigh molecular weight polyethylene and silica.

11. The battery of claim 6, wherein the separator comprises ultrahigh molecular weight polyethylene and silica.

12. The separator of claim 1, wherein the transversely extending ribs are formed integrally from the porous membrane.

13. The battery of claim 6, wherein the transversely extending ribs are formed integrally from the porous membrane.

* * * * *